United States Patent
Holm et al.

(10) Patent No.: US 6,633,944 B1
(45) Date of Patent: Oct. 14, 2003

(54) AHB SEGMENTATION BRIDGE BETWEEN BUSSES HAVING DIFFERENT NATIVE DATA WIDTHS

(75) Inventors: Jeffrey J. Holm, Eden Prairie, MN (US); Steven M. Emerson, Chanhassen, MN (US); Matthew D. Kirkwood, West St. Paul, MN (US)

(73) Assignee: LSI Logic Corporation, Milpitas, CA (US)

( * ) Notice: Subject to any disclaimer, the term of this patent is extended or adjusted under 35 U.S.C. 154(b) by 0 days.

(21) Appl. No.: 10/000,716

(22) Filed: Oct. 31, 2001

(51) Int. Cl.⁷ ............................................... G06F 13/00
(52) U.S. Cl. ................... 710/306; 710/100; 710/52; 370/402
(58) Field of Search ................... 710/100, 52, 310, 710/107, 315, 307, 305, 306; 370/402, 916

(56) References Cited

U.S. PATENT DOCUMENTS

| | | | |
|---|---|---|---|
| 4,309,754 A | * | 1/1982 | Dinwiddie, Jr. |
| 5,590,287 A | * | 12/1996 | Zeller et al. |
| 5,664,117 A | * | 9/1997 | Shah et al. |
| 5,768,545 A | * | 6/1998 | Solomon et al. |
| 6,065,093 A | * | 5/2000 | Dell et al. |
| 6,076,128 A | * | 6/2000 | Kamijo et al. |
| 6,101,565 A | * | 8/2000 | Nishtala et al. |
| 6,147,672 A | * | 11/2000 | Shimamoto |

* cited by examiner

Primary Examiner—Gopal C. Ray
(74) Attorney, Agent, or Firm—Christopher P. Maiorana PC

(57) ABSTRACT

A bus bridge generally comprising a first interface, a second interface, a plurality of registers and a controller. The first interface may be connectable to a first bus having a first data width. The second interface may be connectable to a second bus having a second data width narrower than the first data width. The plurality of registers may be configured to buffer (i) data, (ii) an address, and (iii) a plurality of control signals between the first bus and the second bus. The controller configured to control the registers.

20 Claims, 4 Drawing Sheets

AHB SEGMENTATION BRIDGE BETWEEN BUSSES HAVING DIFFERENT NATIVE DATA WIDTHS

FIELD OF THE INVENTION

The present invention relates to a method and/or architecture for implementing bus bridges generally and, more particularly, to a method and/or architecture for implementing bus bridges that segment bus.

BACKGROUND OF THE INVENTION

High-speed processors, memory and peripherals require features and performance beyond what can currently be provided by the Advanced High-performance Bus (AHB) of the Advanced Microcontroller Bus Architecture (AMBA) specification defined by ARM Limited. The high-speed AMBA peripherals have created needs for enhancements to the AHB and for multiple AHBs in a single ASIC. High performance 64-bit processors commonly need to be interfaced to 64-bit high speed memory and peripheral circuits and 32-bit memory and peripheral circuits. A conventional approach is to connect all memory circuits and peripheral circuits with a single AHB bus. Another conventional approach is to connect the 64-bit circuits and the 32-bit circuits to different AHB buses and communicate between busses through mailboxes or similar devices.

The conventional single-bus approach degrades a performance of the AHB bus and the processor. Connecting the 64-bit memory circuits and 32-bit peripherals on a single 64-bit bus requires the processor to do 32-bit accesses to the peripherals. The processor needs to differentiate between the 64-bit and 32-bit devices to ensure that a 64-bit access is not performed to a 32-bit device. Existing software must be modified to ensure that the processor does not generate an incorrect type of bus transaction. The 64-bit AHB bus will not be fully utilized since the 32-bit peripherals will only use ½ of an available throughput. Furthermore, the 32-bit transactions lower an overall bandwidth that is available to other 64-bit masters on the AHB bus.

The conventional dual-bus approach creates complexity. Connecting the 64-bit circuits to a 64-bit AHB bus and the 32-bit circuits to a 32-bit AHB bus requires the processor to interface with and communicate on both busses simultaneously. The software must be modified to distinguish which memory circuits and peripherals are on which bus. Additionally, multiple processors on the 64-bit AHB bus must coordinate with each other when transferring data between the busses.

SUMMARY OF THE INVENTION

The present invention concerns a bus bridge generally comprising a first interface, a second interface, a plurality of registers and a controller. The first interface may be connectable to a first bus having a first data width. The second interface may be connectable to a second bus having a second data width narrower than the first data width. The plurality of registers may be configured to buffer (i) data, (ii) an address, and (iii) a plurality of control signals between the first bus and the second bus. The controller configured to control the registers.

The objects, features and advantages of the present invention include providing a method and/or architecture for implementing bus bridges that may (i) segment a bus for legacy peripheral compatibility, (ii) operate at a high clock frequency, (iii) run each bus segment at a different rate, (iv) provide for a similar native bus width on each segment, (v) provide for different native bus widths on each segment, (vi) perform endianess conversions between the segments, (vii) make the native bus width of the legacy peripherals transparent to the software, (viii) increase an overall bus bandwidth available to other 64-bit bus masters on the same bus segment, and/or (ix) reduce capacitive loading on the bus segments.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Figure 1:
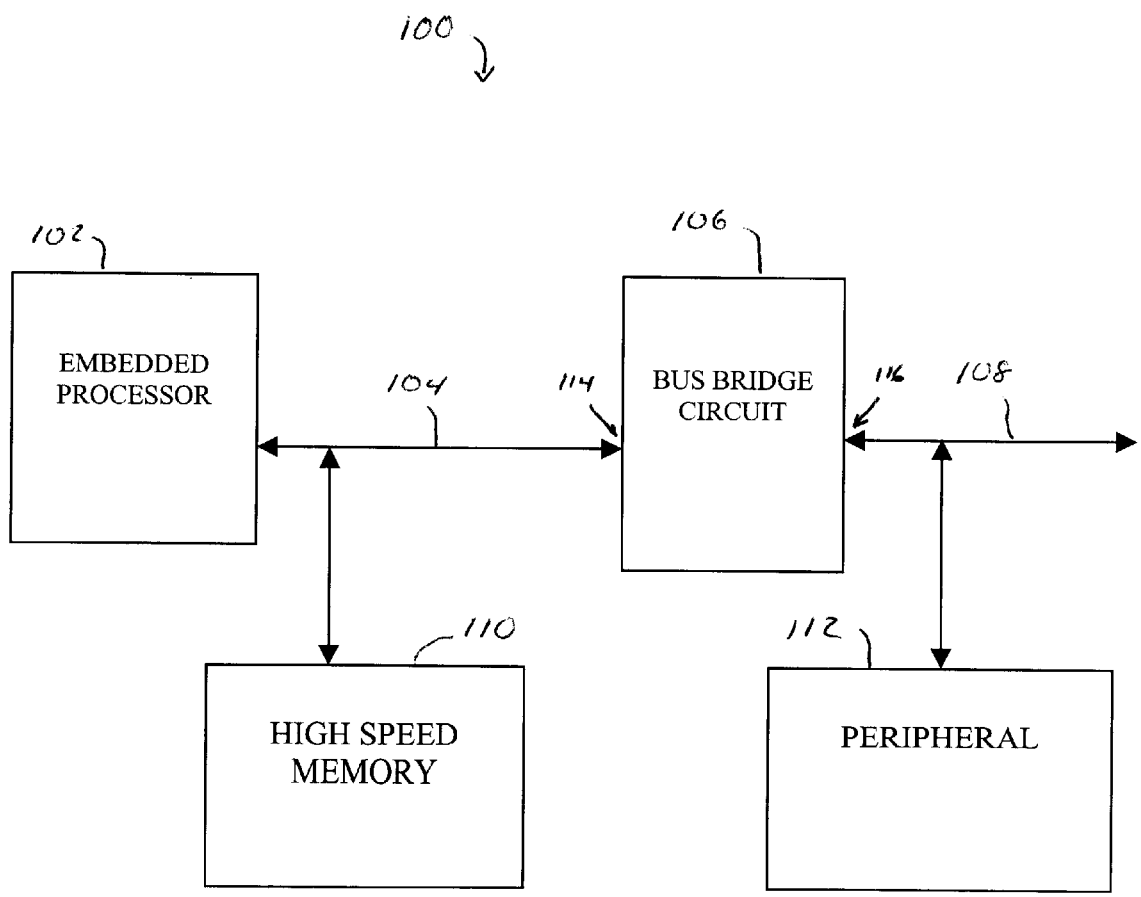
FIG. 1 is a block diagram of a preferred embodiment of the present invention.

Referring to FIG. 1, a block diagram of system 100 is shown in accordance with a preferred embodiment of the present invention. The system generally comprises a processor 102, a first bus 104, a circuit 106, a second bus 108, one or more circuits 110, and one or more circuits 112. The processor 102 may be connected to the first bus 104. The circuits 110 may be connected to the first bus 104. The circuits 112 may be connected to the second bus 108. The circuit 106 may have an interface 114 connectable to the first bus 104 and another interface 116 connectable to the second bus 108.

The first bus 104 may be implemented as a first bus segment of an Advanced High-performance Bus (AHB) defined by the Advanced Microcontroller Bus (AMBA) specification, Revision 2.0. The AMBA specification is published by ARM Limited of Cambridge, England and is hereby incorporated by reference in its entirety. Other variations of the AHB bus, such as multi-layer AHB, arbitrated AHB, AHB-Lite, may also be implemented to meet the design criteria of a particular application. Other busses, such as off-chip busses may also be implemented according to the present invention.

The first bus segment 104 may be implemented with (i) a 64-bit native bus width (e.g., a 64-bit data width), (ii) a clock frequency in excess of 100 MHz (e.g., 120 MHz), (iii) allow burst transactions and/or (iv) include sideband signals. The first bus segment 104 may prohibit (i) SPLIT transactions, RETRY transactions, (iii) arbitration, and/or (iv) transfers misaligned to address boundaries. Removing the SPLIT and RETRY transactions may simplify the first bus segment 104 by decreasing gate counts and making verification easier. Multi-layer and multi-port systems may make the SPLIT and RETRY transactions obsolete for the most part. If there are multiple masters on the first bus segment 104, Multi-Layer AHB multiplexers (not shown) may be used for arbitration instead of the signals HBUSREQ and HGRANT. Other implementations of the first bus segment 104 may be provided to meet the design criteria of a particular application.

The second bus 108 may be implemented as a second bus segment of the AHB. The second bus segment 106 may be implemented having a 32-bit native width. The second bus segment 108 may be implemented with (i) a clock frequency (e.g., 60 MHz) at an integer fraction of the clock frequency of the first bus segment 104, (ii) allow SPLIT transaction, (iii) RETRY transactions, (iv) ERROR transactions, and/or (v) arbitration. The second bus segment 108 may prohibit (i) burst transactions and/or (ii) sideband signals. The AHB-Lite wrapper may be implemented as necessary to support full 32-bit AHB bus legacy peripherals 112. Other implementations of the second bus segment 108 may be provided to meet the design criteria of a particular application. Examples, of other implementations for the first bus segment 104 and the second bus segment 108 include, but are not limited to, having the same clock frequency for both bus segments 104 and 108, having the same native width for both bus segments 104 and 108, having different AHB feature sets for each bus segment 104 and 108, providing multiple processors on the first bus segment 104, and allowing SPLIT transactions, RETRY transactions and/or arbitration on the first bus segment 104.

The processor 102 may be implemented as a 64-bit high-performance embedded processor. The circuit 110 may be implemented as a 64-bit double data rate (DDR) high-speed memory controller. The circuit 110 may also be implemented as other types of 64-bit high-speed peripheral circuits. In general, the circuits 112 may be implemented as 32-bit peripheral circuits. The peripheral circuits 112 may include, but are not limited to, controllers, input/output circuits, other memory circuits and/or other processors.

The circuit 106 may be implemented as a bus bridge circuit configured to connect the first bus segment 104 with the second bus segment 108. The bus bridge circuit 106 generally allows the AHB bus to be split into two or more segments for performance, efficiency and backward compatibility purposes. All transfers may be registered or buffered while passing through the bus bridge circuit 106. Furthermore, on each side of the bus bridge circuit 106 the clocks may be at different frequencies, have different synchronization (e.g., asynchronous or synchronous), the bus widths may be different sizes, and the AHB feature set may be different.

The AHB specification generally defines a fully featured bus. However, only portions of the AHB specification are normally implemented by a given master or slave. High performance peripherals generally need high performance busses. The bus bridge circuit 106 generally allows the first bus segment 104 to be customized to the needs of the 64-bit high-speed processor 102 and circuits 110. The bus bridge circuit 106 may also allow the second bus segment 108 to be customized to the needs of the 32-bit peripheral circuits 112 without sacrificing a backwards compatibility of legacy AMBA peripherals circuits 112.

Timing on the first bus segment 104 may be better with the bus bridge circuit 106 than without. The timing may be improved because there may be only two electrical loads, (i) the memory circuit 110 and (ii) the bus bridge circuit 106 loading the first bus segment 104. Additionally, the processor 102 may implement specific sideband signals for the memory circuit 110, such as byte enable signals, to improve transfer efficiencies. Where the sideband signals are beneficial to a transfer involving the second bus segment 108, the bus bridge circuit 106 may convert the sideband signals to an equivalent AHB transfer or transfers.

Bus segmentation generally refers to a separation of a set of peripherals that were originally implemented on the same physical bus or two or more separate busses such that the loading on each bus is reduced from the original implementation. In a segmented bus, operations from one bus segment to another may require an extra clock cycle of latency to complete. However, individual bus segments may be able to operate at higher clock frequencies due to the reduced capacitive loading on each bus segment.

Bus segmentation may also refer to a translation or adaptation from one bus to another that has the same protocol (e.g., the AHB) but where the busses have some feature or implementation differences. Two busses may be efficiently bridged if a specific request on one side of the bridge has an equivalent operation or set of operations that can be performed such that the original request is fully implemented on the other side. An example of a bridge implementation that does not fully segment the bus is a bridge without read data registers or write data registers. As a result, the bridge cannot translate a 64-bit data request on a 64-bit bus segment to a 32-bit bus segment. Without read data registers or write data registers, the bridge cannot store the data and then multiplex the data as required between the wider and narrower bus-segments.

It may be possible to implement a bridge that uses multiplexing to shift bytes of a 64-bit request from the wider bus segment to the proper lanes of the narrower bus segment without using internal registers by wait-stating the wider bus segment. However, wait-stating the wider bus may be an inefficient utilization of the wider bus since no other transaction may be possible until the entire operation has completed. Where a system using such a bridge is entirely synchronous, the overall performance of the system may be lowered.

Figure 2:
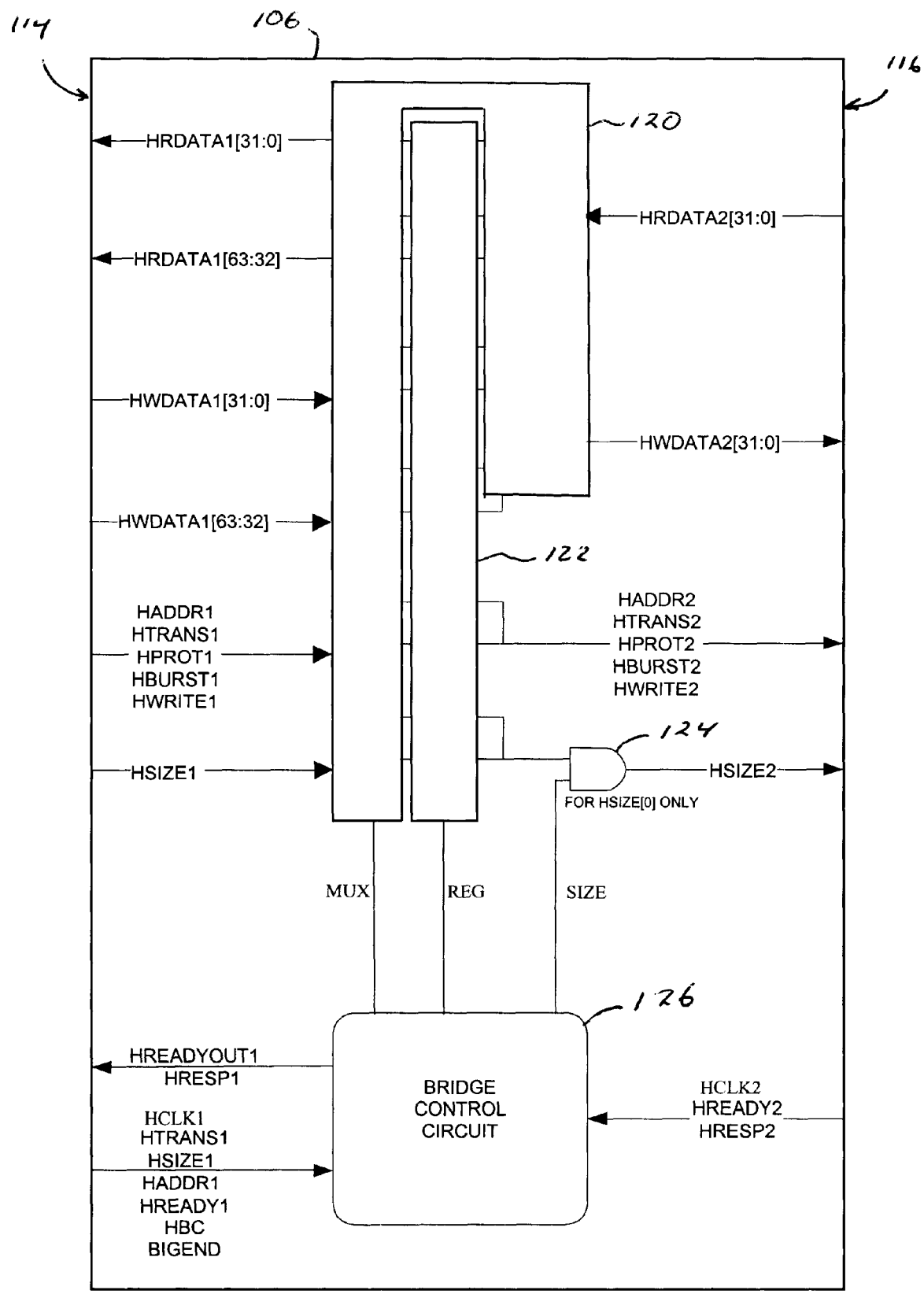
FIG. 2 is a block diagram of a bus bridge circuit.

Referring to FIG. 2, a block diagram of an example circuit implementing the bus bridge circuit 106 is shown. The bus bridge circuit 106 generally implements a unidirectional data flow. In particular, bus requests may be initiated on the first bus segment 104 side and responded to by the second bus segment 108 side.

A typical read or write transfer may be initiated by a bus master device (e.g., the processor 102) on the first bus segment 104 and targeted for a slave device (e.g., the peripheral 112) on the second bus segment 108. The bus bridge circuit 106 may be selected and state machines internal to a controller may cause the address to be latched or buffered. The bus bridge circuit 106 may then request access to the second bus segment 108. Depending upon whether the initial request is buffered or unbuffered, the bus bridge circuit 106 may either (i) latch the write data and respond with a "ready" on the first bus segment 104 (e.g., the buffered request) or (ii) wait-state the first bus segment 104 until the entire operation completes (e.g., the unbuffered request). Once access to the second bus segment 108 has been granted, the bus bridge circuit 106 may continue to perform the transaction until a slave device response is detected. The transaction may then be completed and the bus bridge circuit 106 may return to a normal non-busy state.

The bus bridge circuit 106 generally comprises a multiplex circuit 120, a register circuit 122, a logic gate 124, and circuit 126. The multiplex circuit 120 may receive and present data signals from the first interface 114 and the second interface 116. The multiplex circuit 120 may also receive control signals from the first interface 114 and present control signals to the second interface 116. The multiplex circuit 120 may receive an address from the first interface 114 and present an address to the second interface 116. The register circuit 122 may buffer the data signals, the control signals, and the addresses.

The circuit 126 may be implemented as a bridge control circuit. In one embodiment, the bridge control circuit 126 may be a state machine. The bridge control circuit 126 may receive control signals from the first interface 114 and the second interface 116. The bridge control circuit 126 may present control signals from the first interface 114.

The bridge control circuit 126 may also present a signal (e.g., MUX) to the multiplex circuit 120 to control multiplexing. The bridge control circuit 126 may present a signal (e.g., REG) to the register circuit 122 to control buffering. The bridge control circuit 126 may present a signal (e.g., SIZE) to the logic gate 124 to control a bit of a control signal (e.g., HSIZE1) indicating a width of a data transfer initiated on the first bus segment 104 side.

Other implementations of the bus bridge circuit 106 may be provided to meet the design criteria of a particular application. For example, the bus bridge circuit 106 may provide for bidirectional data flow between the first bus segment 104 and the second bus segment 108. The bus bridge circuit 106 may also provide for tristate bus designs.

Figure 3:
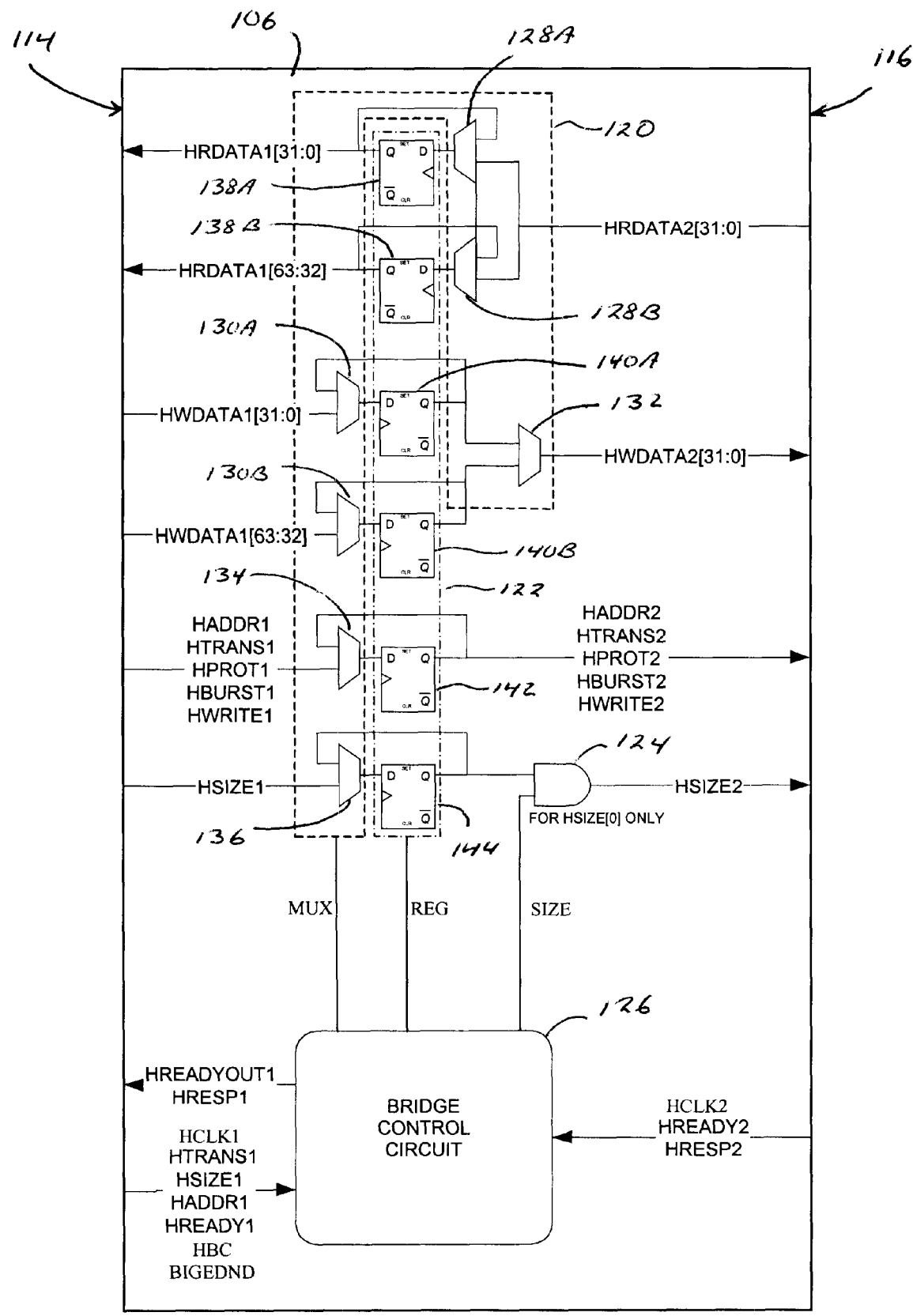
FIG. 3 is a detailed block diagram of the bus bridge circuit.

Referring to FIG. 3, a detailed block diagram of the bus bridge circuit 106 is shown. The multiplex circuit 120 may comprise multiplexers 128A–B, multiplexers 130A–B, a multiplexer 132, a multiplexer 134, and a multiplexer 136. The register circuit 122 may comprise registers 138A–B, registers 140A–B, a register 142, and a register 144. The signal MUX may comprise an individual signal (not shown for clarity) for each multiplexer 130A–B, 132, 134, and 136. The signal REG may comprise an individual signal (not shown for clarity) for each register 138A–B, 140A–B, 142 and 144. In one embodiment, the signal REG may be a single signal received by each register 138A–B, 140A–B, 142 and 144.

The multiplexer 130A may receive a signal (e.g., HWDATA1[31:0] through the first interface 114. The signal HWDATA1[31:0] may be implemented as a lower 32 bits of a 64-bit write type data signal. The signal HWDATA1[31:0] may form a first portion of the data signals handled by the bus bridge circuit 106.

The multiplexer 130B may receive a signal (e.g., HWDATA1[63:32]) through the first interface 114. The signal HWDATA1[63:32] may be implemented as an upper 32 bits of the 64-bit write type data. The signal HWDATA1[63:32] may form a second portion of the data signals.

The register 140A may receive the signal HWDATA1[31:0] from the multiplexer 130A. The register 140A may present a signal (e.g., HWDATA2[31:0]) to the multiplexer 132. The signal HWDATA2 [31:0] may be implemented as a 32-bit write type data signal. The signal HWDATA2[31:0] may also be received at an input to the multiplexer 130A.

The multiplexer 132 may receive the signal HWDATA1[31:9] as buffered by the register 140A. The multiplexer 132 may also receive the signal HWDATA1[63:32] as buffered by the register 140B. The multiplexer 132 may present a signal (e.g., HWDATA2[31:0]) at the second interface 116. The signal HWDATA2[31:0] may be implemented as a 32-bit write type data signal. The signal HWDATA2[31:0] may represent the first portion and the second portion of the data signals at different times, as selected by the multiplexer 132.

The registers 140A–B and the multiplexer 132 may be controlled by the bridge control circuit 126 to convert a single transfer of a 64-bit write data signal (e.g., the signal HWDATA1[31:0] and the signal HWDATA1[63:32]) from the first bus segment 104 into two transactions of the 32-bit signal HWDATA2[31:0] on the second bus segment 108.

The 64-bit write data signal may be transferred into the registers 140A–B in a single transaction on the first bus segment 104 through the multiplexers 130A–B. The data signal may then be transferred to the second bus segment 108 from each register 140A–B in sequence through the multiplexer 132. The registers 140A–B may retain the first and the second portions of the data signal through several cycles of the signal REG by feeding the signals HWDATA1[31:0] and HWDATA1[63:32] back to inputs of the registers 140A–B through the multiplexers 130A–B respectively.

The multiplexers 128A–B may receive a signal (e.g., HRDATA2[31:0]). The signal HRDATA2 may be implemented as a 32-bit read type data signal. The signal HRDATA2[31:0] may be received at the second interface 116. The signal HRDATA2[31:0] may comprise a third portion of the data signals handled by the bus bridge circuit 106.

The registers 138A may present a signal (e.g., HRDATA1[31:0]). The signal HRDATA1[31:0] may be implemented as a 32-bit read type data signal. The signal HRDATA1[31:b] may be presented at the first interface 114 by the register 138A. The signal HRDATA1[31:0] may also be presented to an input of the multiplexer 128A to allow the register 138A to buffer the signal HRDATA1[31:0] through several cycles of the signal REG.

The registers 138B may present a signal (e.g., HRDATA1[63:32]). The signal HRDATA1[63:32] may be implemented as a 32-bit read type data signal. The signal HRDATA1[63:32] may be presented at the first interface 114 by the register 138B. The signal HRDATA1[63:32] may also be presented to an input of the multiplexer 128B to allow the register 138B to buffer the signal HRDATA1[63:32] through several cycles of the signal REG.

The registers 138A–B and the multiplexers 128A–B may be controlled by the bridge control circuit 126 to convert two 32-bit read data transfers from the second bus segment 108 into a single 64-bit transaction on the first bus segment 104. A first 32-bit data transaction within the signal HRDATA2[31:0] may be buffered into the register 138A. A second 32-bit data transaction within the signal HRDATA2[31:0] may be buffered into the register 138B. The data may then be transferred to the first bus segment 104 as a 64-bit transaction by presenting the signal HRDATA1[63:32] and the signal HRDATA1[31:0] simultaneously on the first bus segment 104.

The multiplexer 134 may receive multiple control signals from the first interface 114. In general, the control signals may be passed from the processor 102 on the first bus segment 104 side to the peripheral 112 on the second bus segment 108 side. The control signals may comprise a signal (e.g., HTRANS1), a signal (e.g., HPROT1), a signal (e.g., HBURST1), and a signal (e.g., HWRITE1). The multiple control signals may form a first portion of the control signals handled by the bus bridge circuit 106. The multiplexer 134 may also receive the address (e.g., HADDR1) from the first interface 114.

The multiplexer 134 may present the control signals and the address signal HADDR1 to the register 142 for buffering. The register 132 may present buffered control signals and a buffered address signal (e.g., HADDR2) at the second interface 116. The buffered control signals may comprise a signal (e.g., HTRANS2), a signal (e.g., HPROT2), a signal (e.g., HBURST2), and a signal (e.g., HWRITE2). The buffered control signals and the buffered address signal HADDR2 may be feed back through the multiplexer 134 to an input of the register 142 to maintain the signals in the register 142 when desired.

The multiplexer 136 may receive a control signal (e.g., HSIZE1) from the first interface 114. The signal HSIZE1 may define a transfer size of a data transfer initiated on the first bus segment 104. The signal HSIZE1 may form a second portion of the control signals handled by the bus bridge circuit 106.

The register 144 may buffer the signal HSIZE1. The register 144 may present a buffered control signal (e.g., HSIZE2) from the second interface 116. The transfer size information may be maintained by the register 144 through several cycles of the signal REG by feeding the signal HSIZE2 back to an input of the register 144 through the multiplexer 136.

The logic gate 124 may receive a lowest bit (e.g., HSIZE2 [0]) of the signal HSIZE2. The logic gate 124 may modify the lowest bit in response to the signal SIZE to indicate a proper transfer size on the second bus segment 108. For example, a 64-bit transaction may cause the signal HSIZE1 to be received at the first interface 114 with a lowest bit HSIZE1[0] set to a logical one state. The register 144 may present the signal HSIZE1 to the logic gate 124 as the signal HSIZE2 with the lowest bit HSIZE2[0] set to the logical one state. The logic gate 124 may force the lowest bit HSIZE2[0] to a logical zero state to indicate a 32-bit transfer on the second bus segment 108.

The bridge control circuit 126 may receive control signals from the first interface 114 and the second interface 116. The control signals received from the first interface 114 may include a signal (e.g., HTRANS1), the signal HSIZE1, a signal (e.g., HREADY1), a signal (e.g., HBE) and a signal (e.g., BIGEND). The bridge control circuit 126 may also receive a clock signal (e.g., HCLK1) and the address signal HADDR1, from the first interface 114. The control signals received from the second interface 116 may include a signal (e.g., HREADY2) and a signal (e.g., HRESP2). The bridge control circuit 126 may optionally receive another clock signal (e.g., HCLK2) from the second interface 116. The bridge control circuit 126 may present several control signals from the first interface 114. The control signals presented from the first interface include a signal (e.g., HREADYOUT1) and a signal (e.g., HRESP1).

The signal HBE may be implemented as a byte enable signal. The signal HBE may be used to support odd size transfers. The signal BIGEND may be implemented as an indicator of which endianess is active. Additional details about the AHB defined control signals may be found in the incorporated AMBA specification.

The bridge control circuit 126 may use the clock signal HCLK1 and the control signals received from the first interface 114 to generate the signals MUX, the signals REG, and the signal SIZE when conducting a transfer from the first interface 114 to the second interface 116. The bridge control circuit 126 may use the clock signal HCLK1 and the control signals received from the second interface 116 to generate the signals MUX and the signals REG when conducting a transfer from the second interface 116 to the first interface 114. The bridge control circuit 126 may use the clock signal HCLK2 when necessary for timing purposes to control the signals MUX and the signals REG when receiving the signal HRDATA2[31:0] from the second interface 116.

The signal HREADY2 and the signal HRESP2 may be transferred by the bridge control circuit 126 from a slave peripheral 112 on the second bus segment 108 to the processor 102 on the first bus segment 104. Since a single 64-bit transaction on the first bus segment 104 generally causes two transactions on the second bus segment 108, the transactions cannot be passed through the bridge control circuit 126 directly. For both reads and writes, the bridge control circuit 126 may generate the signal HREADYOUT1 and the signal HRESP1 for the first bus segment 104. For a read, the signals HREADYOUT1 and HRESP1 may be generated in synchronization with the signal HRDATA2 [31:0] from the second transaction on the second bus segment 108. For a write, the signals HREADYOUT1 and HRESP1 may be generated immediately and independently of the two write transactions on the second bus segment 108.

Figure 4:
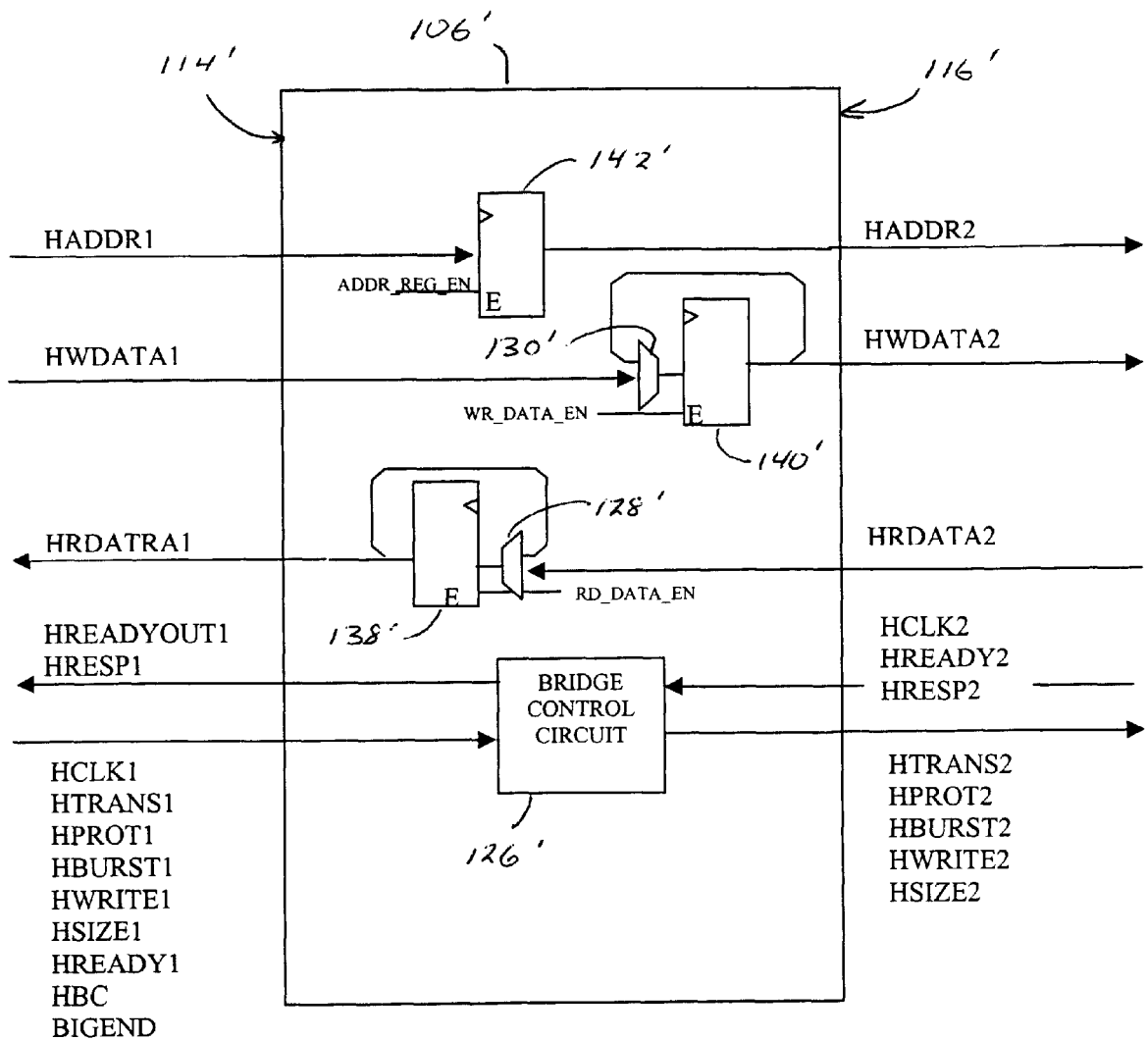
FIG. 4 is a block diagram of another embodiment of the bus bridge circuit.

Referring to FIG. 4, a block diagram of another bus bridge circuit 106' implementing the present invention is shown. The bus bridge 106' may have an interface 114' connectable to a first bus segment 104'. The bus bridge 106' may have an interface 116' connectable to a second bus segment 108'. The first bus segment 104' and the second bus segment 108' may have the same native bus width—whereas the first bus segment 104 and the second bus segment 108 did not.

The bus bridge circuit 106' generally comprises a bridge control circuit 126', a multiplexer 128', a multiplexer 130', a register 138' a register 140' and a register 142'. The register 142' may be configured to buffer the signal HADDR1 and present the signal HADDR2. An enable signal (e.g., ADDR_REG_EN) may be provided to the register 142' from the bridge control circuit 126'.

The register 140' may be configured to buffer the signal HWDATA1 and present the signal HWDATA2. An enable signal (e.g., WR_DATA_EN) may be provided to the register 140' from the bridge control circuit 126'. The multiplexer 130' may provide feedback from an output of the register 140' to an input of the register 140' to maintain the data while the register 140' is clocked by the bridge control state machine 126'. Since the signals HWDATA1 and HWDATA2 have the same width, the multiplexer 132 (FIG. 3) may not be required to disassemble the write data.

The register 138' may be configured to buffer the signal HRDATA2 and present the signal HRDATA1. An enable signal (e.g., RD_DATA_EN) may be provided to the register 138' from the bridge control circuit 126'. The multiplexer 128' may provide feedback from an output of the register 138' to an input of the register 138' to maintain the data while the register 138' is clocked by the bridge control circuit 126'. Since the signals HRDATA2 and HRDATA1 have the same width, the multiplexer 128B (FIG. 3) may not be required to assemble the read data.

The bridge control circuit 126' may receive control signals from the first interface 114' and the second interface 116'. The control signals received from the first interface 114' may include the signals HTRANS1, HSIZE1 and HREADY1. The bridge control circuit 126 may also receive the clock signal HCLK1 and the address signal HADDR1 form the first interface 114'. The control signals received from the second interface 116' may include the signals HREADY2 and HRESP2. The bridge control circuit 126' may optionally receive the clock signal HCLK2 from the second interface 116'. The bridge control circuit 126' may present control signals from the first interface 114'. The control signals presented from the first interface 114' include the, signal HREADYOUT1 and HRESP1. The bridge circuit 126' may also present control signals from the second interface 116'. The control signals presented from the second interface 116' may include the signals HTRANS2, HPROT2, HBURST2, HWRITE2, and HSIZE2.

The bridge control circuit 126 may use the clock signal HCLK1 and the control signals received from the first interface 114' to generate the signals ADDR_REG_EN and WR_DATA_EN when conducting a transfer from the first interface 114' to the second interface 116'. The bridge control circuit 126' may use the clock signal HCLK1 and the control signals received from the second interface 116' to generate the signal RD_DATA_EN when conducting a transfer from the second interface 116' to the first interface 114'. The bridge control circuit 126' may use the clock signal HCLK2 when necessary for timing purposes to control the signals RD_DATA_EN when receiving the signal HRDATA2 from the second interface 116'.

Additional features and signals could be added to the bus bridge circuit in addition to those in the AHB. The bus bridge circuit may introduce an effectively zero latency or a predefined latency. The bus bridge circuit may implement multi-cycle paths. Multiple busses may be coupled on each side of the bus bridge circuit. Switching logic could be added to the bus bridge circuit. Additionally, other multiplexers and/or decoders could be added to the bus bridge circuit.

Other adaptations or improvement that a segmenting bus bridge circuit may perform include, but are not limited to, improved bus loading, higher bus clock frequencies, different native bus widths, and endianess conversions. In systems where a large number of peripherals need to be adapted to the bus, it may be desirable to segment the peripherals onto multiple bus segments. Segmenting may reduce the total capacitive loading on each bus segment due to a reduced fanout and number of multiplexing levels. As a result, each bus segment may operate at a higher clock speed than if all loads were on a common physical bus.

It may be desirable in a system with a segmented bus to run the bus segments at different clock rates, either synchronously or asynchronously. For a synchronous bus system where one of the bus segments operates at an integer sub-multiple of the other bus segment, an extra signal may be created to allow the bus bridge circuit to determine the bus cycle boundaries. The slower speed bus segment may use two or more first bus clocks to define the second bus clock. The bus bridge circuit should understand where the boundaries are between the first bus clock and the second bus clock. For an asynchronous segmented bus where the two bus frequencies have no phase and/or frequency relationship, the bus bridge circuit may be implemented with synchronization logic to properly handle the communications between the bus segments.

The native bus width between the various bus segments may be the same or different. The phrase "native bus width" generally refers to the total number of data bus bits implemented as part of a read or write data bus width. For a given bus implementation using the AHB standard, the read data bus width and the write data bus width may be the same. For example, an AHB bus having a 32-bit wide read data bus may have a 32-bit wide write data bus. To accommodate request sizes between segments having different native bus widths, the bridge may perform an assembly or disassembly operation on the data. Without the assembly/disassembly capability, master device on a wide bus segment may be required to perform only read or write requests that are equal to or less than the size of the narrowest bus segment. As a result, bus utilization of the wider bus segment may suffer as only a fraction of the available bandwidth may be used.

The tern "endianess" generally refers to the byte ordering and numbering within a memory system that is multiple bytes wide. There are two conventional orderings, commonly referred to as Bid Endian and Little Endian. The bridge may perform the necessary endianess conversions to accommodate different conventions on each bus segment.

The various signals of the present invention are generally "on" (e.g., a digital HIGH, or 1) or "off" (e.g., a digital LOW, or 0). However, the particular polarities of the on (e.g., asserted) and off (e.g., de-asserted) states of the signals may be adjusted (e.g., reversed) accordingly to meet the design criteria of a particular implementation. Additionally, inverters may be added to change a particular polarity of the signals.

As used herein, the term "simultaneously" is meant to describe events that share some common time period but the term is not meant to be limited to events that begin at the same point in time, end at the same point in time, or have the same duration.

While the invention has been particularly shown and described with reference to the preferred embodiments thereof, it will be understood by those skilled in the art that various changes in form and details may be made without departing from the spirit and scope of the invention.

What is claimed is:

1. A bus bridge comprising:
    a first interface connectable top a first bus having a first data width;
    a second interface connectable to a second bus having a second data width narrower than said first data width;
    a plurality of registers configured to buffer (i) data, (ii) an address, and (iii) a plurality of control signals between said first bus and said second bus; and
    a controller configured to control said registers, wherein said first interface, said second interface, said registers and said controller are on a same chip with said first bus and said second bus.

2. The bus bridge according to claim 1, further comprising a first multiplexer configured to multiplex a first and a second portions of said data buffered by said registers for presentation from said second interface.

3. The bus bridge according to claim 2, further comprising:
    a second multiplexer configured to multiplex said first portion received at said first interface and said first portion buffered by said registers for presentation to said registers; and
    a third multiplexer configured to mutiplex said second portion recieved at said first interface and said second portion buffered by said registers for presentation to said registers.

4. The bus bridge according to claim 3, further comprising:
    a fourth multiplexer configured to multiplex a third portion of said data received at said second interface and said third portion buffered by said registers for presentation to said registers; and
    a fifth multiplexer configured to multiplex said third portion received at said second interface and said third portion buffered by said registers for presentation to said registers, wherein said first interface presents said third portion as buffered by said registers through said fourth multiplexer and said fifth multiplexer.

5. The bus bridge according to claim 1, further comprising a control multiplexer configured to multiplex a first portion of said control signals received at said first interface and said first portion buffered by said registers for presentation to said registers, wherein said second interface presents said first portion buffered by said registers.

6. The bus bridge according to claim 5, wherein said control multiplexer is further configured to multiplex said address received at said first interface and said address buffered by said registers for presentation to said registers, wherein said second interface presents said address buffered by said registers.

7. The bus bridge according to claim 6, further comprising a size multiplexer configured to multiplex a second portion of said control signals received at said first interface and second portion buffered by said registers for presentation to said registers.

8. The bus bridge according to claim 7, further comprising a logic gate configured to modify said second portion buffered by said registers for presentation from said second interface.

9. The bus bridge according to claim 8, wherein said second portion of said control signals received at said first interface indicates said first data width.

10. The bus bridge according to claim 9, further comprising:
 a first plurality of multiplexers configured to multiplex said data, said address and said control signals received at said first interface and presented at said interface for presentation to said registers;
 a second plurality of multiplexers configured to multiplex said data received at said second interface and presented at said first interface for presentation to said registers;
 a data multiplexer configure to multiplex said data buffered by said registers for presentation to said interface; and
 a logic gate configured to modify a data transfer size signal of said control signals buffered by said registers for presentation from said second interface.

11. A method of bridging between a first interface connectable to a first bus and a second interface connectable to a second bus, the method comprising the steps of:
 (A) buffering data between said first interface and said second interface where said second interface has a second data width narrower than a first data width of said first interface;
 (B) buffering an address between said first interface and said second interface;
 (C) buffering a plurality of control signals between said first interface and said second interface;
 (D) controlling said buffering of said data, said address, and said control signals in response to said control signals; and
 (E) converting and endianess for said data between said first bus and said second bus.

12. The method according to claim 11, further comprising the step of first multiplexing a first and a second portion of said data in response to buffering for presentation from said second interface.

13. The method according to claim 12, further comprising the steps of:
 second multiplexing said first portion received at said first interface and said first portion as buffered; and
 third multiplexing said second portion received at said first interface and said second portion as buffered.

14. The method according to claim 13, further comprising the steps of:
 fourth multiplexing a third portion of said data received at said second interface and said third portion as buffered;
 fifth multiplexing said third portion received at said second interface and said third portion as buffered; and
 presenting said third portion as buffered from said first interface in response to said fourth multiplexing and said fifth multiplexing.

15. The method according to claim 11, further comprising the steps of:
 multiplexing a first portion of said control signals received at said first interface and said first portion as buffered; and
 presenting said first portion as buffered from said second interface.

16. The method according to claim 15, further comprising the steps of:
 multiplexing said address received at said first interface and said address as buffered; and
 presenting said address as buffered from said second interface.

17. The method according to claim 16, further comprising the step of multiplexing a second portion of said control signals received at said first interface and said second portion as buffered.

18. The method according to claim 17, further comprising the steps of:
 modifying said second portion as buffered; and
 presenting said second portion as modified from said second interface.

19. The method according to claim 18, wherein said second portion of said control signals received at said first interface indicates said first data width.

20. A bus bridge comprising:
 a first interface connectable to a first bus having a first data width;
 a second interface connectable to a second bus having a second data width narrower than said first data width;
 a plurality of registers configured to buffer (i) data, (ii) an address, an (iii) a plurality of control signals between said first bus and said second bus;
 a controller configured to control said registers, wherein said first interface, said second interface, said registers and said controller are on a same chip with said first bus and said second bus; and
 a first multiplexer configured to multiplex a first and a second portions of said data buffered by said registers for presentation from said second interface.

* * * * *